United States Patent
Taylor et al.

(10) Patent No.: US 10,445,791 B2
(45) Date of Patent: Oct. 15, 2019

(54) SYSTEMS AND METHODS FOR AUTONOMOUS ASSISTANCE AND ROUTING

(71) Applicant: Walmart Apollo, LLC, Bentonville, AR (US)

(72) Inventors: Robert James Taylor, Rogers, AR (US); Matthew Allen Jones, Bentonville, AR (US); Aaron James Vasgaard, Fayetteville, AR (US); Nicholaus Adam Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 148 days.

(21) Appl. No.: 15/677,647

(22) Filed: Aug. 15, 2017

(65) Prior Publication Data
US 2018/0068356 A1 Mar. 8, 2018

Related U.S. Application Data (60) Provisional application No. 62/384,990, filed on Sep. 8, 2016.

(51) Int. Cl.
*G06Q 30/02* (2012.01)
*G05D 1/02* (2006.01)
(Continued)

(52) U.S. Cl.
CPC ....... *G06Q 30/0281* (2013.01); *B62B 3/1472* (2013.01); *G05D 1/0011* (2013.01);
(Continued)

(58) Field of Classification Search
USPC ........................................... 701/434
See application file for complete search history.

(56) References Cited

U.S. PATENT DOCUMENTS 6,601,759 B2  8/2003 Fife et al.
6,886,101 B2  4/2005 Glazer et al.
(Continued)

FOREIGN PATENT DOCUMENTS

EP     623904 A1    11/1994

OTHER PUBLICATIONS

AcuityBrands, ByteLight™ Services: Indoor Positioning. Retrieved online at: <http://hydrel.acuitybrands.com/sitecore/content/acuitybrandscorporate/home/solutions/services/bytelight-services-indoor-positioning>. 2 pages (2017).
(Continued)

*Primary Examiner* — Tyler D Paige
(74) *Attorney, Agent, or Firm* — McCarter & English, LLP; David R. Burns (57) ABSTRACT

An example customer assistance system and associated methods are described. The example customer assistance system includes a shopping cart, a customer assistance unit mounted on the shopping cart, and a location system disposed remotely from the shopping cart and the customer assistance unit. The customer assistance unit includes a light source oriented upwards relative to horizontal, and an actuator for actuating the light source into an illumination position. In the illumination position, the light source projects a light beam over the shopping cart. The locating system includes at least one image capturing device configured to scan a ceiling for the light beam and to determine a source location of the shopping cart based on a ceiling location of the light beam.

20 Claims, 8 Drawing Sheets

(51) Int. Cl.
*B62B 3/14* (2006.01)
*G05D 1/00* (2006.01)
*G06Q 20/20* (2012.01)
*G06Q 30/06* (2012.01)

(52) U.S. Cl.
CPC ........... *G05D 1/0234* (2013.01); *G06Q 20/20* (2013.01); *G06Q 30/0283* (2013.01); *G06Q 30/06* (2013.01); *B64C 2201/12* (2013.01); *G05D 2201/0216* (2013.01)

(56) References Cited

U.S. PATENT DOCUMENTS

| | | |
|---|---|---|
| 7,222,363 B2 | 5/2007 | Rice et al. |
| 7,431,208 B2 | 10/2008 | Feldman et al. |
| 7,587,756 B2 | 9/2009 | Peart et al. |
| 8,572,712 B2 | 10/2013 | Rice et al. |
| 8,814,039 B2 | 8/2014 | Bishop et al. |
| 8,820,633 B2 | 9/2014 | Bishop et al. |
| 8,851,369 B2 | 10/2014 | Bishop et al. |
| 8,989,922 B2 | 3/2015 | Jones et al. |
| 9,047,631 B2 | 6/2015 | Sridharan et al. |
| 9,270,952 B2 | 2/2016 | Jamtgaard et al. |
| 9,550,577 B1 | 1/2017 | Beckman et al. |
| 9,573,684 B2 | 2/2017 | Kimchi et al. |
| 2012/0296751 A1 | 11/2012 | Napper |
| 2014/0244437 A1 | 8/2014 | Longino |
| 2015/0025929 A1 | 1/2015 | Abboud et al. |
| 2015/0120094 A1 | 4/2015 | Kimchi et al. |
| 2015/0277440 A1 | 10/2015 | Kimchi et al. |
| 2016/0110701 A1* | 4/2016 | Herring .............. G01G 19/4144 705/17 |
| 2016/0196755 A1 | 7/2016 | Navot et al. |
| 2016/0257401 A1 | 9/2016 | Buchmueller et al. |
| 2016/0260161 A1* | 9/2016 | Atchley .................... E01H 5/12 |
| 2017/0110017 A1 | 4/2017 | Kimchi et al. |
| 2017/0300999 A1* | 10/2017 | Wilkinson ......... G06Q 30/0631 |

OTHER PUBLICATIONS

Lowe's Innovation Labs, Automatic Human Guided Shopping Trolley with Smart Shopping System (online)<<http://www.lowesinnovationlabs.com/innovation-robots/>. (2015).

* cited by examiner

SYSTEMS AND METHODS FOR AUTONOMOUS ASSISTANCE AND ROUTING

CROSS-REFERENCE TO RELATED APPLICATIONS

This application claims the benefit of commonly assigned U.S. Provisional Patent Application No. 62/384,990, which was filed on Sep. 8, 2016. The entire content of the foregoing provisional patent application is incorporated herein by reference.

BACKGROUND

When a customer needs assistance in a retail environment, such as for asking about a specific product or requesting assistance to locate a product, the process generally involves walking through the retail environment until a retail associate is encountered. The first retail associate encountered by the customer may not know the answer to the customer's question or may not know the location of the requested item. Therefore, the process can be prolonged until a retail associate specific to the department in question is paged and arrives to assist the customer. The process can therefore take a significant amount of time, resulting in frustration of the customer.

SUMMARY

Exemplary embodiments of the present disclosure provide a customer assistance system that provides the customer with means for requesting assistance directly from a shopping cart. In particular, the customer assistance system includes a light source on the shopping cart that can be used to indicate a request for assistance by the customer (e.g., by activating the light source). The activated light source is monitored by a location system that sends a retail associate and/or an autonomous robot or unmanned vehicle (e.g., a drone) to the location of the activated light source to assist the customer.

In accordance with embodiments of the present disclosure, an exemplary customer assistance system is provided that generally includes a shopping cart, a customer assistance unit mounted on the shopping cart, and a locating system disposed remotely from the shopping cart and the customer assistance unit. The customer assistance unit includes a light source orientated upwards relative to horizontal (e.g., towards a ceiling) when the customer assistance unit is mounted on the shopping cart. The customer assistance unit includes an actuator to selectively energize the light source into an illumination position. Actuation of the light source into the illumination position projects a light beam upwards from and over the shopping cart. The location system includes at least one image capturing device configured to scan the ceiling for the light beam and to determine a source location of the shopping cart having the customer assistance unit that is emitting the light beam based on a ceiling location of the light beam.

The customer assistance unit can include an audible signal source. Actuation of the light source into the illumination position with the actuator can simultaneously (or substantially simultaneously) actuate the audible signal source to output an audible signal. In some embodiments, the light source can be configured to project the light beam in one or more different colors (e.g., different color patterns, or the like). A difference between the one or more different light colors can be outside of a human visible spectrum. In some embodiments, the customer assistance unit can include a radio frequency transmitter. Actuation of the light source into the illumination position with the actuator can simultaneously (or substantially simultaneously) actuate the radio frequency transmitter to output a radio frequency signal.

The location system can include an autonomous robot or unmanned vehicle configured to scan the ceiling for the light beam and to determine the source location of the shopping cart having the customer assistance unit that is emitting the light beam based on the ceiling location of the light beam. The autonomous robot or unmanned vehicle can be, e.g., an aerial drone, an autonomous vehicle, or the like. The autonomous robot or unmanned vehicle can include an audio system configured to detect statements spoken by a user of the shopping cart. Based on statements spoken by the user of the shopping cart, the autonomous robot or unmanned vehicle can be configured to guide the user of the shopping cart to a location of a specific item in a retail environment. In some embodiments, the autonomous robot or unmanned vehicle can include a light source configured to illuminate a path or directional indicators in the retail environment to guide the user of the shopping cart to the location of the specific item. In some embodiments, the autonomous robot or unmanned vehicle can include a light source configured to illuminate at least a portion of the specific item.

In accordance with embodiments of the present disclosure, an exemplary customer assistance unit is provided that includes a body configured to be mounted on a shopping cart. The customer assistance unit includes a light source associated with the body. The light source can be oriented upwards relative to horizontal when the body is mounted on the shopping cart. The customer assistance unit includes an actuator to switch the light source into an illumination position. Actuation of the light source into the illumination position projects a light beam over the shopping cart.

In accordance with embodiments of the present disclosure, an exemplary method of assisting a customer is provided that includes providing a customer assistance system as described herein. The method includes actuating the light source into an illumination position with the actuator to project a light beam onto a ceiling over the shopping cart. The method includes scanning the ceiling for the light beam with the at least one image capturing device. The method includes determining a source location of the shopping cart based on a ceiling location of the light beam. The location system can include an autonomous robot or unmanned vehicle. The autonomous robot or unmanned vehicle can travel to the source location of the shopping cart and guide a user of the shopping cart to a specific item in a retail environment with the autonomous robot or unmanned vehicle.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed customer assistance system and associated methods, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

Exemplary embodiments of the present disclosure provide a customer assistance system that allows a customer to request assistance directly from a shopping cart. In particular, the customer assistance system includes a light source on the shopping cart that can be used to indicate a request for assistance by the customer. The activated light source is monitored by a location system that sends a retail associate and/or an autonomous robot or unmanned vehicle (e.g., a drone) to the location of the activated light source to assist the customer. For example, the retail associate and/or the autonomous robot/unmanned vehicle is capable of answering questions about a product and guiding the customer to the specific location of an item within the retail environment.

Figure 1:
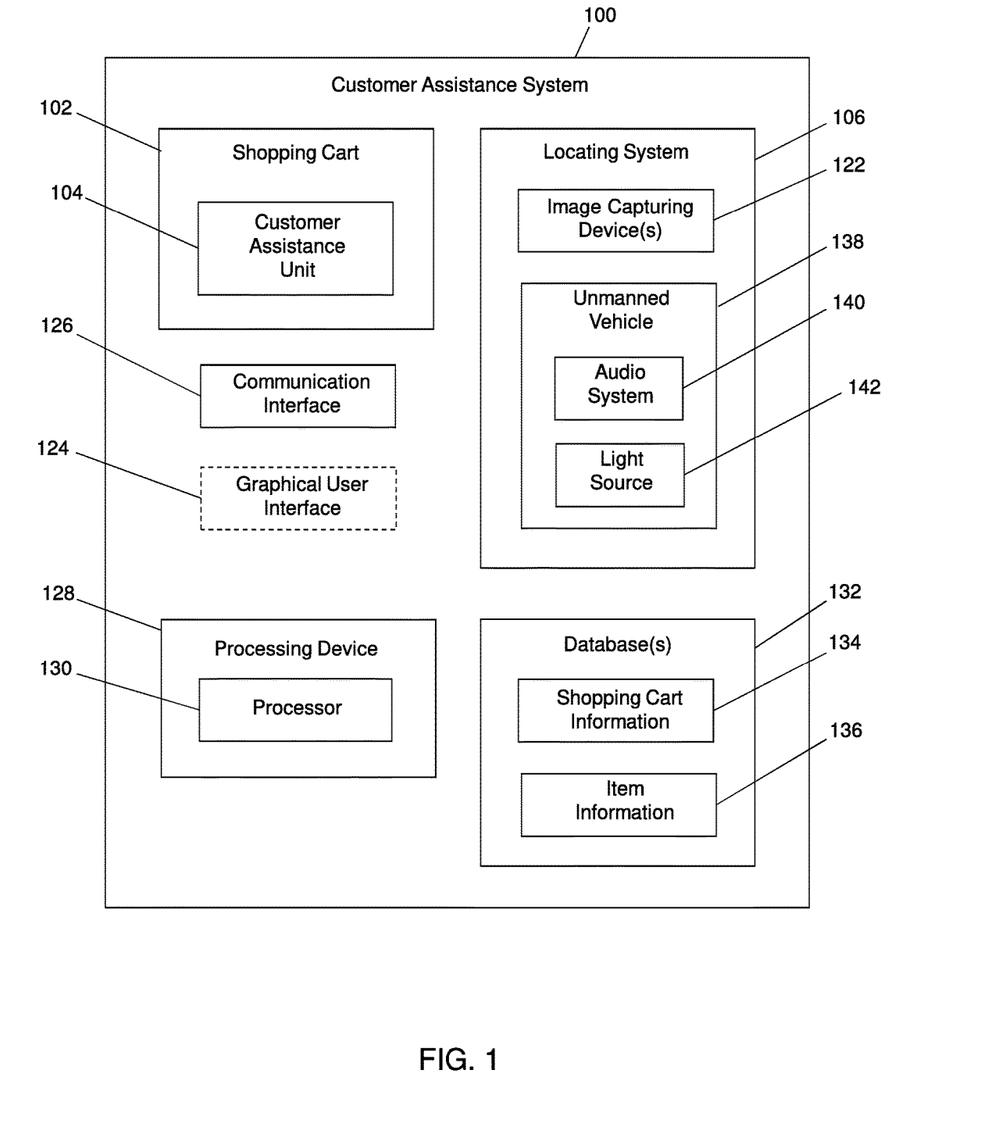
FIG. 1 is a block diagram of an exemplary customer assistance system of the present disclosure.

FIG. 1 is a block diagram of an exemplary customer assistance system 100 (hereinafter "system 100") of the present disclosure. The system 100 generally includes at least one shopping cart 102, a customer assistance unit 104, and a locating system 106. Although illustrated as within the shopping cart 102, it should be understood that the customer assistance unit 104 can be mounted on the shopping cart 102, e.g., the frame or handle of the shopping cart 102.

Figure 2:
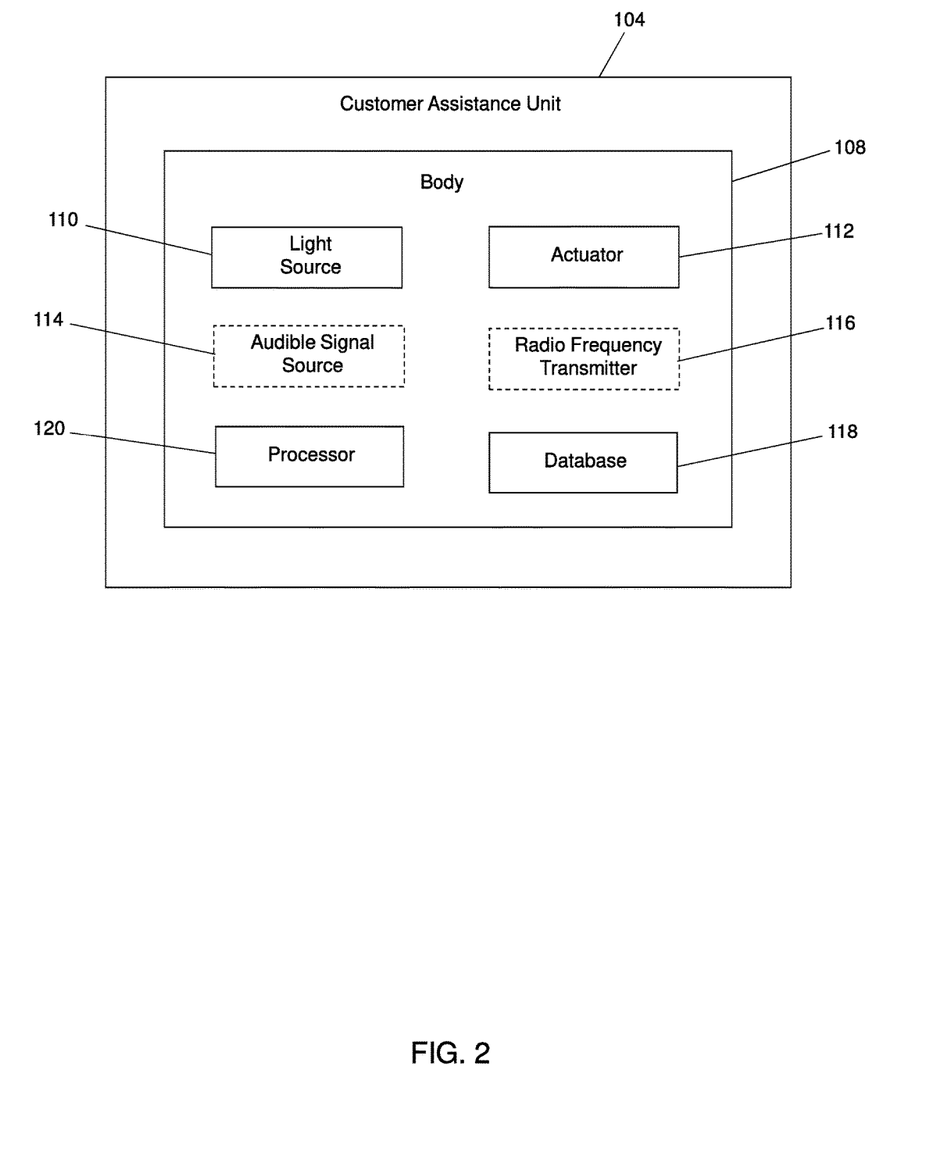
FIG. 2 is a block diagram of an exemplary customer assistance unit of the present disclosure.

With reference to FIG. 2, a block diagram of the customer assistance unit 104 is provided. The customer assistance unit 104 includes a housing or body 108 configured to be mounted on the frame or handle of the shopping cart 102. The customer assistance unit 104 generally includes one or more light sources 110 and an actuator 112 (e.g., a button, switch, or the like). In some embodiments, the customer assistance unit 104 can have multiple actuators 112. The light source 110 and the actuator 112 can be at least partially disposed on or extend from the outside of the body 108 such that the light source 110 can be actuated to project a light beam from the customer assistance unit 104 and the actuator 112 can be actuated by a user of the shopping cart 102. In some embodiments, the shopping cart 102 can include a generator or power source for providing electrical power to the light source 110.

Actuating the light source 110 with the actuator 112 into an illumination position projects a light beam from the light source 110 over the shopping cart 102. In particular, the customer assistance unit 104 can be mounted on the shopping cart 102 such that the light source 110 is oriented upwards (or substantially upwards) relative to horizontal. Thus, actuation of the light source 110 into the illumination position projects the light beam from the light source 110 onto the ceiling directly above the shopping cart 102. The actuator 112 can similarly be used to actuate the light source 110 into an off position.

The light source 110 can be in the form of a single light emitting diode, multiple light emitting diodes grouped together, any tunable light emitting diode, and/or any other suitable light source. The light beam can be of a single color or can be projected in two or more different colors. The light beam can be projected as a steady, single color light beam, a single color light beam having a lighting pattern, or a multiple color light beam having a lighting pattern. In some embodiments, the different light colors of the light beam can be outside of the human visible spectrum and can be detected by one or more portions of the locating system 106 discussed below.

In some embodiments, the customer assistance unit 104 can include an audible signal source 114 and/or a radio frequency transmitter 116 within the body 108 or at least partially extending from the body 108. For example, upon actuation of the light source 110 with the actuator 112, the audible signal source 114 can be simultaneously (or substantially simultaneously) actuated to output an audible signal, e.g., a single continuous tone, a single intermittent tone, a pattern of two or more tones, combinations thereof, or the like. In some embodiments, the audible signal can be outside of the human hearing frequency range. As a further example, upon actuation of the light source 110 with the actuator 112, the radio frequency transmitter 116 can be simultaneously (or substantially simultaneously) actuated to output a radio frequency signal, e.g., a unique radio frequency signal, or the like).

In some embodiments, the customer assistance unit 104 can include multiple actuators 112 for requesting different actions. For example, a first actuator 112 can be used for a price request, a second actuator 112 can be used for requesting an item location, a third actuator 112 can be used for requesting information on a missing item, and a fourth actuator 112 can be used for requesting customer service (e.g., phone activation, indicating that an area needs attention, cleaning or zoning, or the like). In some embodiments, different light beam colors or patterns, different audible signals and/or different radio frequency signals can be used to indicate the specific request or question from the customer based on actuation of a specific actuator 112. For example, a first light beam color or pattern can indicate a price request, a second light beam color or pattern can indicate a request for an item location, a third light beam color or pattern can indicate a request for information on a missing item, and a fourth light beam color or pattern can indicate a request for customer service.

The customer assistance unit 104 can include a database/memory 118 configured to electronically store data relating to the shopping cart 102, e.g., a unique or specific light beam color and/or pattern, a unique or specific audible signal and/or pattern, a unique or specific radio frequency signal and/or pattern, or the like. A processor 120 can be disposed within the body 108. Actuation of the actuator 112 results in actuation of the processor 120 to control the light source 110, the audible signal source 114 and/or the radio frequency transmitter 116.

With reference again to FIG. 1, the locating system 106 generally includes one or more image capturing devices 122. The image capturing devices 122 can be in the form of one or more video capture systems, audio capture systems, light sensing systems, optical scanner systems, radio frequency receivers, combinations thereof, or the like. In some embodiments, the image capturing device 122 can be mounted on the ceiling of the retail environment. In some embodiments, the locating system 106 can include a single image capturing device 122 configured to scan the entire ceiling of the retail environment and/or receive audio or radio frequency signals from the customer assistance units 104 of the respective shopping carts 102. In some embodiments, multiple image capturing devices 122 can be disposed around the retail environment to effectively scan the entire ceiling of the retail environment and/or receive audio or radio frequency signals from the customer assistance units 104 of the respective shopping carts 102. In some embodiments, multiple image capturing devices 122 can be used to detect the light beam, audio signal and/or radio frequency signal of a specific shopping cart 102, and the detected light beam and/or signals can be used to triangulate the location of the shopping cart 102 within the retail environment.

In some embodiments, the detected light beam and/or signals can be transmitted to a graphical user interface (GUI) 124 via a communication interface 126 (e.g., a wired network, wireless network, or the like). In some embodiments, a processing device 128 including a processor 130 can be used to electronically transmit the detected light beam and/or signal information from the locating system to the GUI 124. The GUI 124 can be rendered by a central computing system and/or a handheld device (e.g., a smart device) that can be accessed by a retail associate.

The system 100 can include one or more databases 132 configured to electronically store shopping cart information 134 and/or item information 136. The shopping cart information 134 can include unique identifying information such that when the locating system 106 detects the light beam, audio signal and/or radio frequency signal, the processing device 128 can determine the specific shopping cart 102 requesting assistance and the location of the shopping cart 102. The item information 136 can include information regarding various items available for purchase at the retail environment, such as the item name, brand, price, nutrition facts, location within the retail environment (e.g., aisle and bin), combinations thereof, or the like. The GUI 124 can issue an alert to a retail associate regarding actuation of the light source 110, the audio signal source 114 and/or the radio frequency transmitter 116, and provides the retail associate with the location of the shopping cart 102. Based on such information, the retail associate can approach the shopping cart 102 and assist the customer without necessitating a search by the customer for a retail associate.

In some embodiments, the locating system 106 can include one or more unmanned vehicles 138, e.g., aerial drones, autonomous robots/vehicles, or the like. Each unmanned vehicle 138 can be configured to scan the ceiling for the light beam and determine the source location of the shopping cart 102 based on the location on the ceiling at which the light beam is being projected. Each unmanned vehicle 138 can also be configured to detect audible signals emitted by the audible signal source 114. Each unmanned vehicle 138 can include a radio frequency receiver configured to detect radio frequency signals transmitted by the radio frequency transmitter 116.

Based on the detected light beam, audible signal and/or radio frequency signal, the unmanned vehicle 138 can travel to or near the location of the shopping cart 102 to assist the customer. For example, an unmanned vehicle 138 in the form of an aerial drone can detect the light beam, audible signal and/or radio frequency signal, fly to the location of the shopping cart 102 within the retail environment and hover next to the shopping cart 102. The unmanned vehicle 138 can include an audio system 140 for emitting audible sounds to the customer and detecting audible sounds (e.g., statements) spoken by the customer. For example, the audio system 140 of the unmanned vehicle 138 can detect questions regarding an item and can output statements to answer the questions of the customer. In some embodiments, the customer can communicate with the unmanned vehicle 138 via a smart device (e.g., a smart phone) of the customer.

In some embodiments, the unmanned vehicle 138 can include one or more light sources 142 configured to emit one or more light beams (e.g., a laser projection, a flashing light, combinations thereof, or the like). In some embodiments, based on a request from the customer to locate a particular item in the retail environment, the unmanned vehicle 138 can guide the customer to the location of the item by flying in front of the customer and allowing the customer to follow the unmanned vehicle 138 to the requested location. In some embodiments, as the unmanned vehicle 138 guides the customer to the location of the item, the light source 142 can be used to illuminate a path or directional indicators in the retail environment to assist in guiding the customer.

For example, the light source 142 can emit light beams on the floor of the retail environment in the form of arrows indicating which direction the customer will need to travel. In some embodiments, once the unmanned vehicle 138 has arrived at the aisle and bin of the requested item, the unmanned vehicle 138 can illuminate at least a portion of the requested item with the light source 142 to assist the customer in finding the item. Thus, rather than having to search for a retail associate, the customer can receive immediate assistance from the unmanned vehicle 138 after actuation of the actuator 112 while the customer remains with the shopping cart 102. In some embodiments, the audio system 140 of the unmanned vehicle 138 can be used to emit one or more audible sounds for guiding the customer to the item. In some embodiments, the unmanned vehicle 138 can include a barcode scanner for scanning the barcode associated with the item, and can use the information associated with the barcode to answer questions regarding the item. In some embodiments, rather than guiding the customer to a specific item, the unmanned vehicle 138 can guide the customer to a price check area or can perform a price check based on visual recognition of the item.

Figure 3:
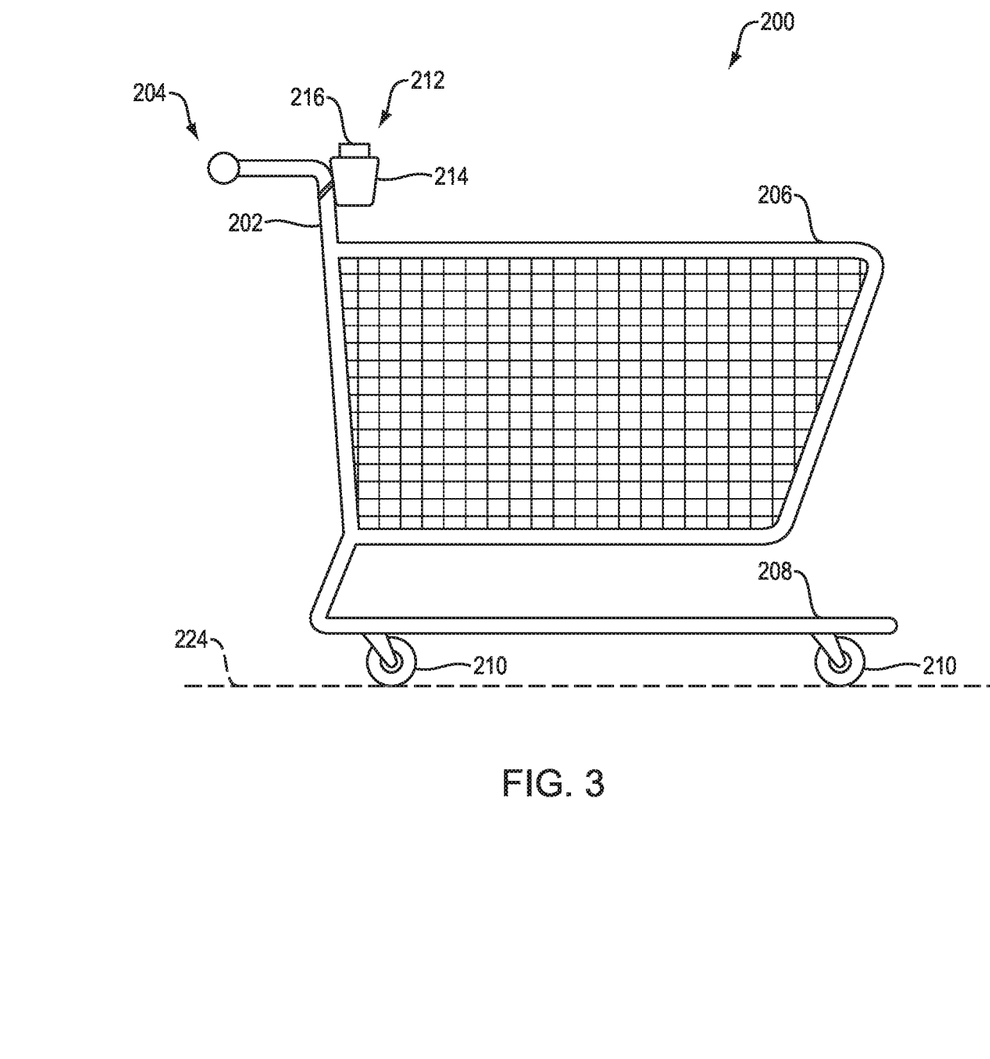
FIG. 3 is a diagram of a shopping cart of an exemplary customer assistance system of the present disclosure.
Figure 4:
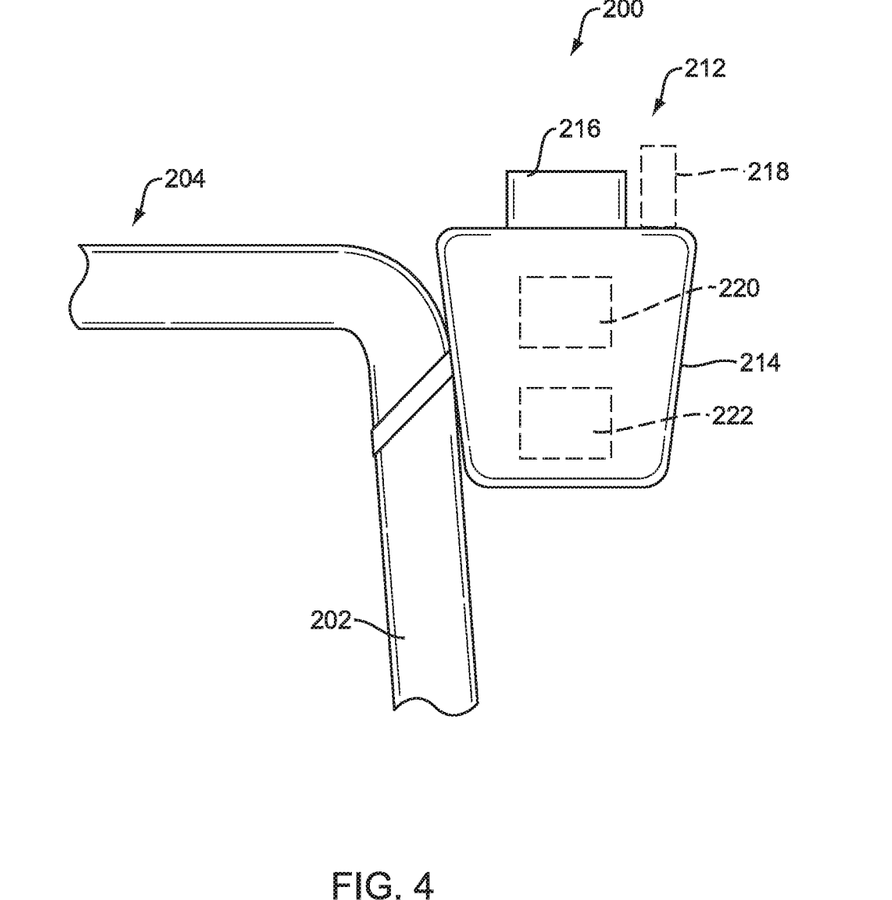
FIG. 4 is a detailed diagram of a shopping cart of FIG. 3.

FIGS. 3 and 4 show diagrammatic views of a shopping cart 200 of the system 100. The shopping cart 200 can include a frame 202 with a handle portion 204, a basket portion 206, a lower rack portion 208 and wheels 210. A customer assistance unit 212 can be mounted to the frame 202, e.g., at or near the handle portion 204. In particular, the customer assistance unit 212 can be mounted to the frame 202 in a location where the customer assistance unit 212 can be conveniently accessed by the customer. The customer assistance unit 212 includes a body 214 with an actuator 216, e.g., a switch including a depressible button, or the like).

The shopping cart 200 includes a light source 218 mounted within or on the body 214. The light source 218 is oriented upwards relative to horizontal 224 such that actuation of the actuator 216 projects a light beam onto the ceiling above the shopping cart 200. In some embodiments, the shopping cart 200 can include an audible signal source 220 and/or a radio frequency transmitter 222 mounted within or on the body 214. The light source 218, audible signal source 220 and radio frequency transmitter 222 can be in electrical communication with the actuator 216 such that actuation of the actuator 216 simultaneously (or substantially simultaneously) actuates the light source 218, audible signal source 220 and radio frequency transmitter 222 to project the light beam, emit the audible signal and transmit the radio frequency signal, respectively.

Figure 5:
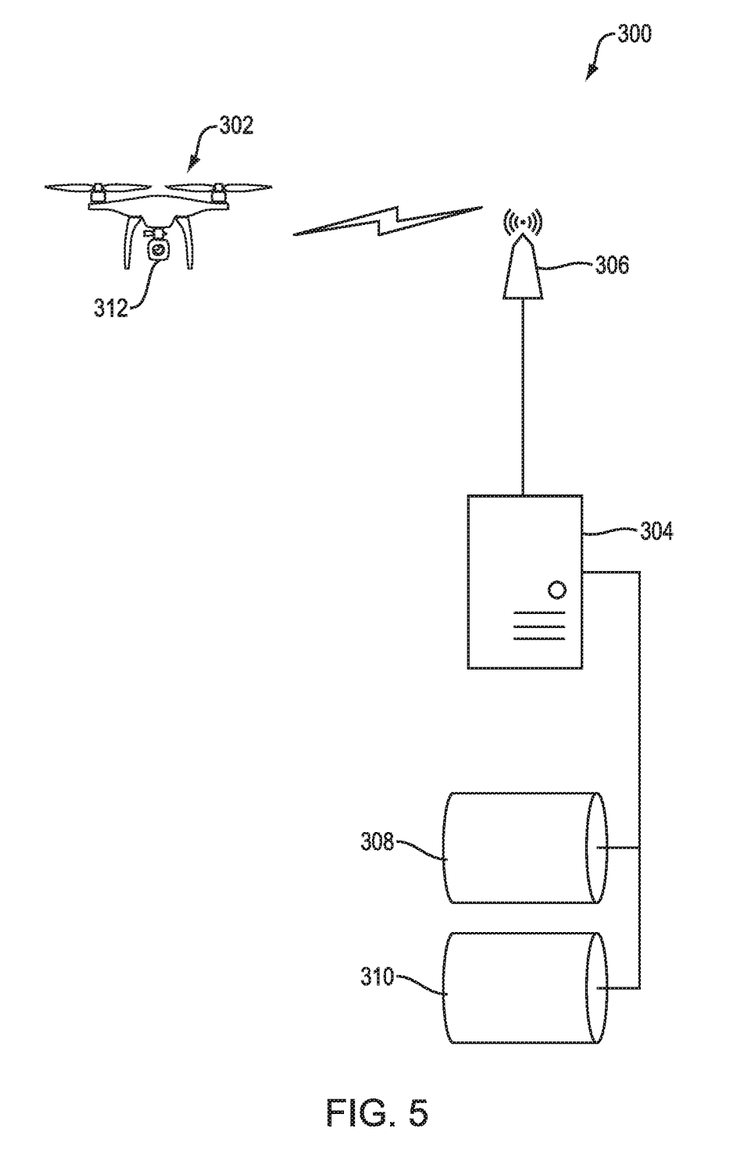
FIG. 5 is a block diagram of an unmanned vehicle system of the present disclosure.

FIG. 5 is a block diagram of an unmanned vehicle system 300 of the system 100. The unmanned vehicle system 300 can include one or more unmanned vehicles 302 (e.g., aerial drones) in wireless communication with one or more servers 304 via a wireless access point 306. Each unmanned vehicle 302 can include a communication device 312 (e.g., an image capturing device, an audio system, a light source, combinations thereof, or the like) configured to detect the light beam, audible signal and/or radio frequency signal emitted by the customer assistance unit 212 of the shopping cart 200, and communicate with the customer during the assistance process.

The server 304 can be communicatively connected to one or more databases 308, 310 such that information stored in the databases 308, 310 can be transmitted to the unmanned vehicle 302 to assist the customer. For example, the database 308 can include information regarding item inventory and information of the retail environment. As a further example, the database 310 can include information regarding an in-store air traffic control system, e.g., a system configured to detect, regulate and coordinate the location and movement of all unmanned vehicles 302 within the retail environment. Thus, upon detection of a light beam, audible signal and/or radio frequency signal from a customer assistance unit 212 indicating that a customer requires assistance, the unmanned vehicle system 300 can send an unmanned vehicle 302 from a location in the retail environment, e.g., a hangar, or the like, to the shopping cart 200 to assist the customer.

Figure 6:
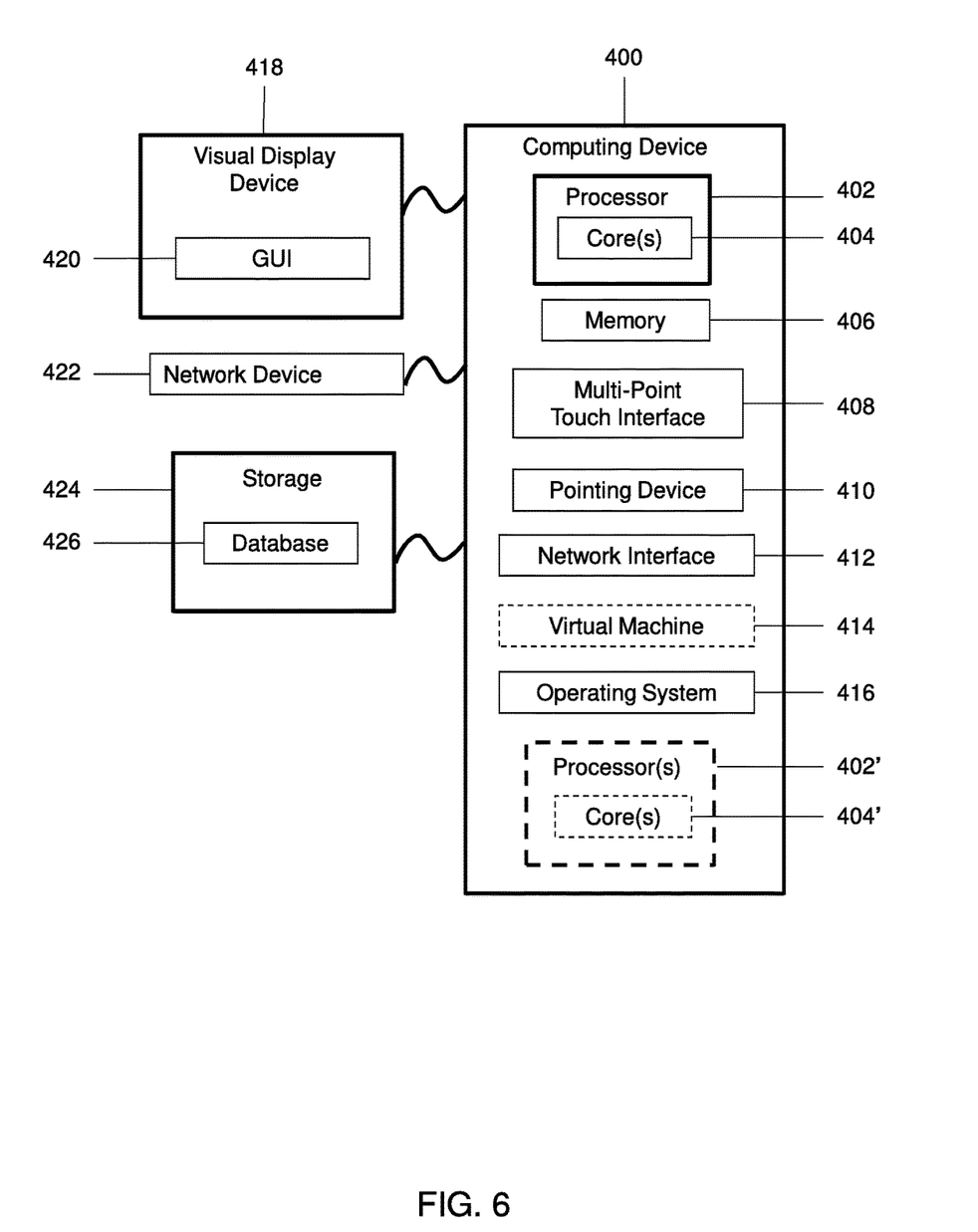
FIG. 6 is a block diagram of a computing device in accordance with exemplary embodiments of the present disclosure.

FIG. 6 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for actuating the light source 110, actuating the audible signal source 114, actuating the radio frequency transmitter 116, controlling one or more portions of the locating system 106, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display one or more user interfaces 420 (e.g., GUI 124) that may be provided in accordance with exemplary embodiments. The computing device 400 may include other I/O devices for receiving input from a user, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the system 100 described herein. Exemplary storage device 424 may also store one or more databases 426 for storing any suitable information required to implement exemplary embodiments. For example, exemplary storage device 424 can store one or more databases 426 for storing information, such as data relating to shopping cart information 134, item information 136, the database 118, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 7:
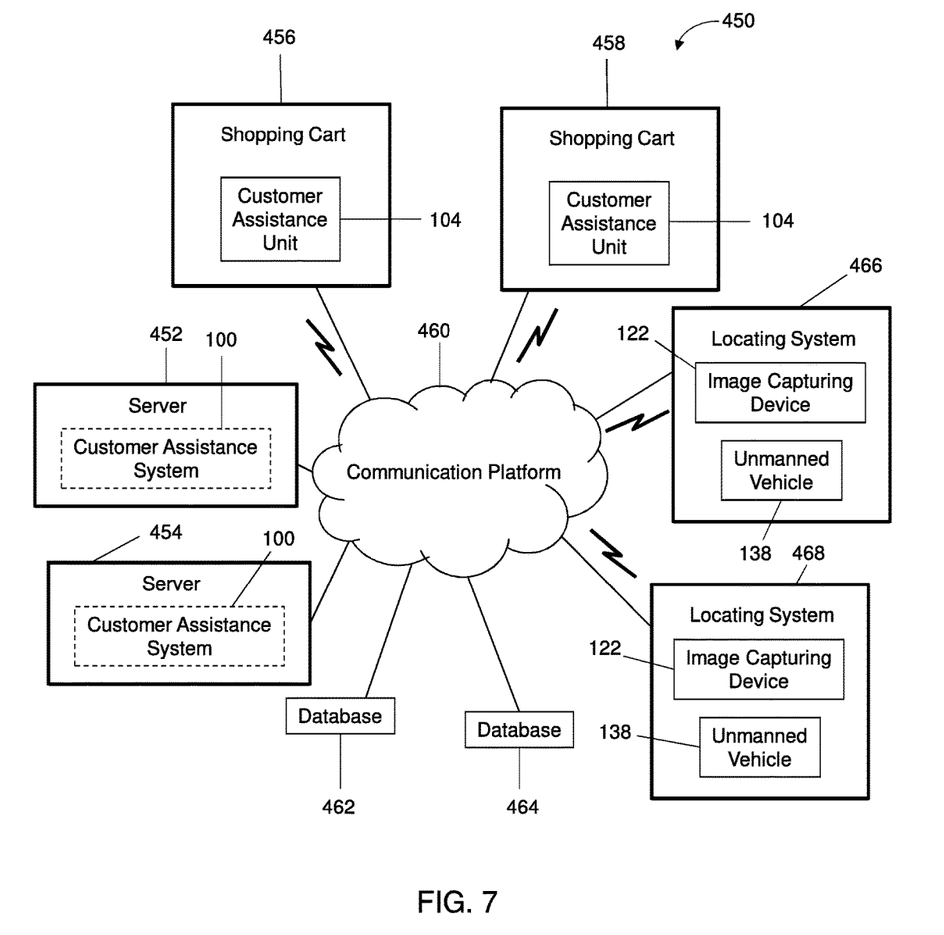
FIG. 7 is a block diagram of an exemplary customer assistance system environment in accordance with embodiments of the present disclosure.

FIG. 7 is a block diagram of an exemplary customer assistance system environment 450 in accordance with exemplary embodiments of the present disclosure. The environment 450 can include servers 452, 454 configured to be in communication with shopping carts 456, 458, via a communication platform 460, which can be any network over which information can be transmitted between devices communicatively coupled to the network. For example, the communication platform 460 can be the Internet, Intranet, virtual private network (VPN), wide area network (WAN), local area network (LAN), and the like. In some embodiments, the communication platform 460 can be part of a cloud environment. The environment 450 can include locating systems 466, 468, which can be in communication with the servers 452, 454, as well as to the shopping carts 456, 458, via the communication platform 460. The environment 450 can include repositories or databases 462, 464, which can be in communication with the servers 452, 454, as well as to the shopping carts 456, 458 and the locating systems 466, 468, via the communications platform 460. In exemplary embodiments, the servers 452, 454, customer assistance units 104 associated with the shopping carts 456, 458, locating systems 466, 468, and databases 462, 464 can be implemented as computing devices (e.g., computing device 400). Those skilled in the art will recognize that the databases 462, 464 can be incorporated into one or more of the servers 452, 454 such that one or more of the servers 452, 454 can include databases 462, 464. In some embodiments, the database 462 can store the shopping cart information 134, and the database 464 can store the item information 136. In some embodiments, a single database 462, 464 can store both the shopping cart information 134 and the item information 136. In some embodiments, embodiments of the servers 452, 454 can be configured to implement one or more portions of the system 100.

Figure 8:
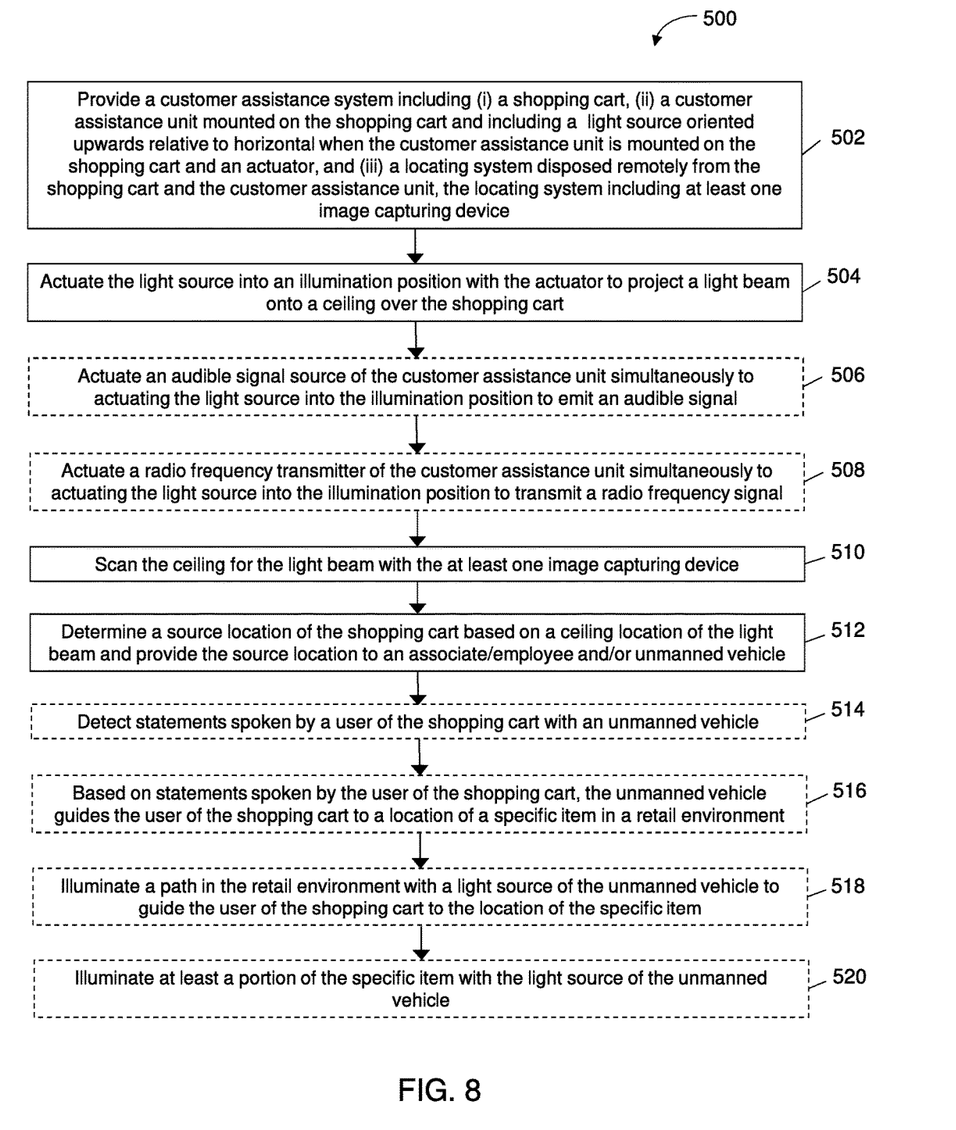
FIG. 8 is a flowchart illustrating an implementation of an exemplary customer assistance system in accordance with embodiments of the present disclosure.

FIG. 8 is a flowchart illustrating an exemplary process 500 as implemented by embodiments of the customer assistance system 100. To begin, at step 502, the customer assistance system 100 is provided that includes a shopping cart, a customer assistance unit and a locating system. The customer assistance unit is mounted on the shopping cart and includes a light source oriented upwards relative to horizontal (e.g., towards a ceiling) when the customer assistance unit is mounted on the shopping cart. The customer assistance unit further includes an actuator. The locating system is disposed remotely from the shopping cart and the customer assistance unit, and includes at least one image capturing device.

At step 504, the light source is actuated into an illumination position with the actuator to project a light beam onto a ceiling over the shopping cart. For embodiments in which the customer assistance unit includes an audible signal source, at step 506, the audible signal source of the customer assistance unit can be actuated simultaneously (or substantially simultaneously) to actuating the light source into the illumination position to emit an audible signal. For embodiments in which the customer assistance unit includes a radio frequency transmitter, at step 508, the radio frequency transmitter of the customer assistance unit can be actuated simultaneously (or substantially simultaneously) to actuating the light source into the illumination position to transmit a radio frequency signal.

At step 510, the ceiling of the retail environment can be scanned by the at least one image capturing device of the locating system. At step 512, a source location of the shopping cart can be determined based on the ceiling location of the light beam and the source location can be provided to an associate/employee (e.g., via transmission to the associate/employees smart device) and/or can be provided to an unmanned vehicle (e.g., via transmission to the unmanned vehicle). For embodiments in which the source location is provided to the associate/employee, the associate/employee can be dispatched to the source locations.

For embodiments in which the customer assistance unit includes an unmanned vehicle, at step 514, statements spoken by a user of the shopping cart can be detected by the unmanned vehicle that is dispatched to the location of the shopping cart. At step 516, based on statements spoken by the user of the shopping cart, the unmanned vehicle can guide the user of the shopping cart to a location of a specific item in a retail environment. At step 518, a path in the retail environment can be illuminated with a light source of the unmanned vehicle to guide the user of the shopping cart to the location of the specific item. At step 520, at least a portion of the specific item can be illuminated with the light source of the unmanned vehicle.

Thus, the exemplary customer assistance system provides the customer with the ability to request assistance directly from a shopping cart. In particular, instead of having the customer search for a retail associate, the retail associate and/or the unmanned vehicle is capable of answering questions about a product and guiding the customer to the specific location of an item within the retail environment based on actuation of the customer assistance unit. As such, the customer experience within the retail environment can be significantly improved.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A customer assistance system, comprising:
a shopping cart;
a customer assistance unit mounted on the shopping cart, the customer assistance unit including (i) a light source oriented upwards relative to horizontal when the customer assistance unit is mounted on the shopping cart, and (ii) an actuator for actuating the light source into an illumination position, wherein actuation of the light source into the illumination position projects a light beam over the shopping cart; and a locating system disposed remotely from the shopping cart and the customer assistance unit, the locating system comprising at least one image capturing device configured to scan a ceiling for the light beam and to determine a source location of the shopping cart based on a ceiling location of the light beam.

2. The customer assistance system of claim 1, wherein the customer assistance unit comprises an audible signal source, and wherein actuation of the light source into the illumination position with the actuator simultaneously actuates the audible signal source to output an audible signal.

3. The customer assistance system of claim 1, wherein the light source is configured to project the light beam in one or more different light colors.

4. The customer assistance system of claim 3, wherein a difference between the one or more different light colors is outside of a human visible spectrum.

5. The customer assistance system of claim 1, wherein the customer assistance unit comprises a radio frequency transmitter, and wherein actuation of the light source into the illumination position with the actuator simultaneously actuates the radio frequency transmitter to output a radio frequency signal.

6. The customer assistance system of claim 1, wherein the locating system comprises an unmanned vehicle configured to scan the ceiling for the light beam and to determine the source location of the shopping cart based on the ceiling location of the light beam.

7. The customer assistance system of claim 6, wherein the unmanned vehicle is an aerial drone or an autonomous vehicle.

8. The customer assistance system of claim 6, wherein the unmanned vehicle comprises an audio system configured to detect statements spoken by a user of the shopping cart.

9. The customer assistance system of claim 8, wherein based on the statements spoken by the user of the shopping cart, the unmanned vehicle is configured to guide the user of the shopping cart to a location of a specific item in a retail environment.

10. The customer assistance system of claim 9, wherein the unmanned vehicle comprises a light source configured to illuminate a path in the retail environment to guide the user of the shopping cart to the location of the specific item.

11. The customer assistance system of claim 9, wherein the unmanned vehicle comprises a light source configured to illuminate at least a portion of the specific item.

12. A customer assistance unit, comprising:
a body configured to be mounted on a shopping cart;
a light source associated with the body, the light source being oriented upwards relative to horizontal when the body is mounted on the shopping cart; and
an actuator for actuating the light source into an illumination position,
wherein actuation of the light source into the illumination position projects a light beam over the shopping cart.

13. The customer assistance unit of claim 12, comprising an audible signal source associated with the body.

14. The customer assistance unit of claim 13, wherein actuation of the light source into the illumination position with the actuator simultaneously actuates the audible signal source to output an audible signal.

15. The customer assistance unit of claim 12, wherein the light source is configured to project the light beam in one or more different light colors.

16. The customer assistance unit of claim 15, wherein a difference between the one or more different light colors is outside of a human visible spectrum.

17. The customer assistance unit of claim 12, comprising a radio frequency transmitter associated with the body.

18. The customer assistance unit of claim 17, wherein actuation of the light source into the illumination position with the actuator simultaneously actuates the radio frequency transmitter to output a radio frequency signal.

19. A method of assisting a customer, comprising:
providing a customer assistance system, the customer assistance system including (i) a shopping cart, (ii) a customer assistance unit mounted on the shopping cart and including a light source oriented upwards relative to horizontal when the customer assistance unit is mounted on the shopping cart and an actuator, and (iii) a locating system disposed remotely from the shopping cart and the customer assistance unit, the locating system comprising at least one image capturing device;
actuating the light source into an illumination position with the actuator to project a light beam onto a ceiling over the shopping cart;
scanning the ceiling for the light beam with the at least one image capturing device; and
determining a source location of the shopping cart based on a ceiling location of the light beam.

20. The method of claim 19, wherein the locating system comprises an unmanned vehicle, the unmanned vehicle traveling to the source location of the shopping cart, and guiding a user of the shopping cart to a specific item in a retail environment with the unmanned vehicle.

* * * * *